April 29, 1969 C. S. WILCOX ET AL 3,441,731

SOLID STATE SWITCHING DEVICE FOR USE IN CAB SIGNALING SYSTEMS

Filed June 20, 1966

INVENTORS
C. S. WILCOX AND
R. P. WORMSBECHER
BY Forest B. Hitchcock
THEIR ATTORNEY

United States Patent Office 3,441,731
Patented Apr. 29, 1969

3,441,731

SOLID STATE SWITCHING DEVICE FOR USE IN CAB SIGNALING SYSTEMS

Clinton S. Wilcox and Roelof P. Wormsbecher, Rochester, N.Y., assignors to General Signal Corporation, Rochester, N.Y., a corporation of New York Filed June 20, 1966, Ser. No. 558,931
Int. Cl. B61l *21/00, 1/18;* H04g *9/00*
U.S. Cl. 246—63 10 Claims

ABSTRACT OF THE DISCLOSURE

Apparatus in a railway cab signaling system which changes voltage from a D.C. source to an alternating voltage of a predetermined code frequency for controlling train operation. Sensing circuitry generates pulses corresponding to a code signal transmitted in the rails, and a plurality of solid state switching devices responsive to the generated electric pulses pole changes the voltage from the D.C. source at the transmitted code frequency. Signaling apparatus tuned to the code frequency gives distinctive indications in the railway cab.

Figures 1, 2:
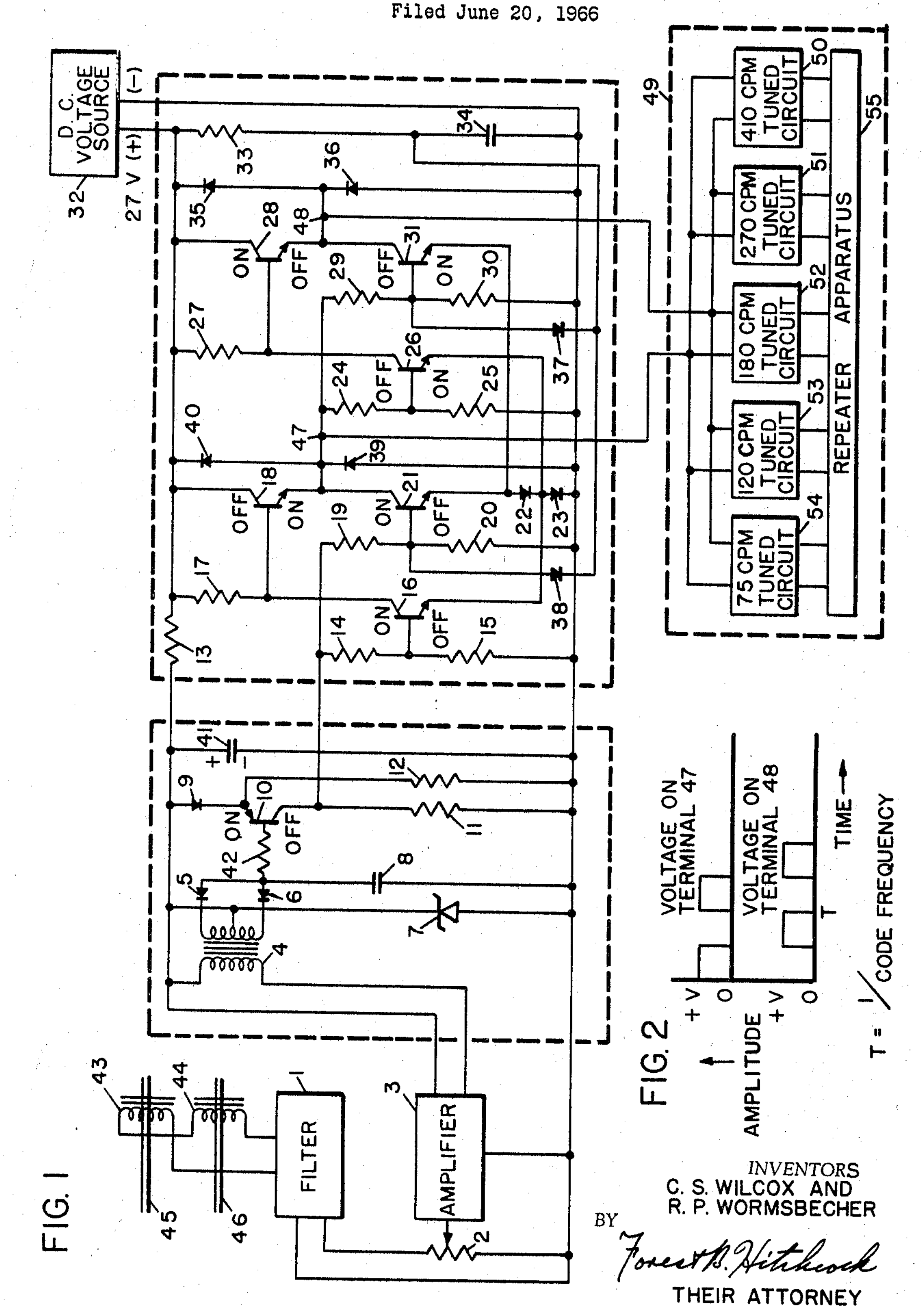

The present invention relates to railway cab signalling systems and more particularly to the utilization of solid state switching techniques.

Railway cab signaling systems transmit information for the purpose of controlling train operation with regard to track conditions in the block ahead. This is accomplished by superimposing specific code signaling frequencies, corresponding to desired control; viz., 270 cycles per minute for 65 m.p.h., 180 cycles per minute for 35 m.p.h., 120 cycles per minute for 25 m.p.h., 75 cycles per minute for 15 m.p.h. and 410 cycles per minute for exit from signal controlled track, upon a particular carrier frequency which is chosen so as to be unique with regard to random frequencies generated in the environment. This modulated signal is transmitted to the cab by conduction along the rails. It is sensed by pick up coils which are attached to the train but forward of it. The coils cut the field lines induced by the signal thus generating a voltage. Once received by the cab, the signals are transformed into pulses corresponding to the modulation frequency of the information coded signal for utilization in switching circuitry.

In the main and in most existing devices this switching circuitry consists of electromagnetic relays and their associated circuit and amplifying means. In the particular system under consideration the switching circuitry is used to transform a D.C. voltage of fixed polarity into an alternating polarity voltage of desired code frequency. This alternating voltage in turn energizes repeater circuits tuned to the various code frequencies. When the tuned circuit corresponding to a particular frequency is rendered operative, it establishes in the cam a distinctive indication corresponding to the transmitted information. This indication is then utilized to notify the operator or to automatically control train operation.

The electromagnetic relays usually employed in this circuitry while improved to a highly efficient state are still not ideal switching members. Their inherent size, inertia, and the dynamics of magnetic reaction introduce considerable problems in reliability, timing and wear. Obviously, replacement of these devices by improved means would add considerable merit to any existing cab signaling systems.

Prior art has established various system improvements. Electronic tubes have been replaced to a great extent by transistor and other solid state devices. Further, some switching relays have been replaced by solid state switching units but others, including that involved in the present invention, have to the present time defined such replacement. This invention therefore seeks to create an improved cab signaling system by replacement of the master code following and pole changing relay with a solid state switching device.

Another object of this invention is to provide a completely transistorized code following and pole changing switching unit.

Still another object of this invention is to provide a small highly reliable and fast acting code following and pole changing switching unit.

Additional objects and a clearer understanding of the invention will become apparent in the following description and drawings. The drawings present a detailed embodiment of this invention and permit incisive analysis.

FIG. 1 is a combination diagrammatic and schematic circuit presentation of the invention. It shows specific circuitry requirements and block representation of associated apparatus.

FIG. 2 indicates the operation of the solid state switching device by a graphical representation of the voltage output at its terminals.

In accordance with the present invention, there is provided in a railway cab signaling system a circuit wherein voltage from a fixed polarity D.C. voltage source is changed to alternating polarity voltage of a predetermined code frequency for controlling train operation. Input means generate electrical pulses of said code frequency. A first solid state switching means electrically connecting to the input means turns off and on in response to the electrical pulses. A plurality of other solid state switching means electrically connecting to the first solid state switching means and the D.C. voltage source responds to the conductance state of the first solid state switching means and pole changes the D.C. voltage at the code frequency. Signaling apparatus electrically connecting to the other solid state switching means gives distinctive indications corresponding to the code frequency.

In brief, the present invention utilizes the signal sensed, amplified and rectified by its associated circuitry, to activate a PNP type transistor switch at a frequency corresponding to the frequency of the coded information. The switching action of this transistor then sequentially alters the conductance of six switching NPN type transistors comprising the heart of the solid state device. By appropriate selection of output terminals within this transistor switching configuration, a voltage output may be obtained which polarity reverses in exact correspondence to the code frequency. This alternating voltage energizes circuits tuned to the desired code frequencies to activate repeater apparatus to produce cab signaling.

For ease of understanding and reading of the following detailed operational description, "on" and "off" will be used to indicate fully conductive and non-conductive states respectively for the transistor switches, in addition the symbols (+) and (−) will indicate plus and minus voltages. These notations are also used in FIG. 1, in addition the "off" and "on" is indicated above and below the base connection thereby designating the relative conductance state for each transistor.

In FIG. 1, power supply 32, any suitable direct current power source of sufficient magnitude for operation with transistor circuitry, in this particular case +27 volts, provides the excitation to the switching circuitry. A transmitted signal is picked up from the tracks 45 and 46 by sensing coils 43 and 44, and conducted to the filter 1 where all frequencies other than the carrier frequency are suppressed thus obviating the possibility of stray frequency signals activating the switching circuitry. Potentiometer 2 adjusts the output of the filter to a desired level for operation with amplifier 3. Amplifier 3 raises the level of the informaton signal by a factor commensurate with its gain and couples the signal to a transformer 4. Transformer 4 and diodes 5 and 6 form a full-wave rectifier circuit. One side of the primary of transformer 4 is connected to the (+) voltage of the power supply 32 while the other is connected to the output of the amplifier 3. The voltage at this point is regulated to (+) 18 volts by the action of Zener diode 7. A center tap terminal on the secondary of the transformer 4 is connected to the (+) 18 volts thereby establishing a reference for the full-wave rectifier circuitry. Capacitor 8 connected between the output of the rectifier and common is of a selected capacitive value so as to filter out any high frequency noise content and to provide smoothing of the wave shape before application of the rectifier output to the base of transistor 10. Resistor 42 electrically connects the output of the full-wave rectifier to the base of transistor 10 and establishes the desired switching signal level. The emitter circuit of transistor 10 is joined to the cathode of diode 9 which in turn is connected to the regulated (+) 18 volt supply; the collector is connected to the (−) side of the D.C. power supply 32 through resistor 11. When not forced into conductance by a negative pulse from the full-wave rectifier, transistor 10 is biased to cut-off by the voltage dividing action of the forward resistance of diode 9 and resistor 12 in its emitter circuitry. A capacitor 41, its (+) terminal connected to the anode of diode 9 and its (−) terminal connected to common, provides additional power supply decoupling or filtering. Assuming no signal applied to transistor 10, therefore in a cut-off state, the following is a description of the conductance states of the various transistors and the functions of the components contained within the switching circuitry.

The transistors are all NPN types although the circuit could be readily modified to utilize PNP types. Transistor 16 its collector connecting to (+) through resistor 17 is in an off condition by the effect of a relatively small voltage being applied to its base and the presence of diode 23 in its emitter circuit causing the emitter to be biased positively with respect to the base. Transistor 21 in similar fashion is in an off position, due to the small signal on its base and the action of diodes 22 and 23 in its emitter circuit introducing biasing as described for transistor 16. Transistor 18 is however, in an on state, for when transistor 16 is off, a positive voltage is applied to the base of transistor 18 from the collector of transistor 21. Diodes 39 and 40 are connected across the emitter and collector terminals of transistors 18 and 21 respectively, the cathodes connecting to the collectors, providing inverse spike and surge voltage protection to the transistors. Further, when power is first applied, the circuit combination of a diode 38, a resistor 33 and a capacitor 34, transiently clamps the base of transistor 21 to common thereby obviating the possibility of transistor 21 being on during start up initial conditions. An output terminal 47 is connected to the junction of the collector of transistor 21 and the emitter of transistor 18. The voltage appearing at this terminal is approximately +27 volts established by the on state of transistor 18 and the off state of transistor 21. Transistor 26 is on as is transistor 31, established by the presence of a positive voltage on their bases introduced by the on condition of transistor 18 and the divider actions of series resistor combinations 24–25 and 29–30 connecting the emitter of transistor 18 to the bases of transistors 26 and 31 respectively. Transistor 26 being on effectively short circuits the base of transistor 28 thereby preventing the appearance of any positive biasing voltage on the base and placing transistor 28 in an off state. Again, as in the case of transistors 18 and 21, diodes 35 and 36 are connected across the emitter and collector terminals of transistors 28 and 31 respectively for inverse surge and spike voltage protection. Also a circuit combination of a diode 37, capacitor 34 and resistor 33 transiently clamps the base of transistor 31 to common during initial start up, thus preventing any possibility of transistor 31 being on during the transient period before steady state is achieved. The second output terminal 48, connected to the junction of the emitter of transistor 28 and the collector of transistor 31, is connected to the (−) side of D.C. power supply 33 through the on condition of transistor 31 and forward resistance of diodes 22 and 23. As shown in FIG. 2, the voltage appearing at the output terminal 47 is +27 volts with respect to terminal 48, for the off or absence of pulse condition of transistor 10. When transistor 10 is placed in a fully conducting state by application of a negative pulse received from the full-wave rectifier, the states of the aforementioned switching transistors reverse as follows:

Transistors 16 and 21 are placed in an on condition by the presence of a positive voltage on their bases introduced by the on condition of transistor 10 and the divider actions of the series combinations of resistors 14–15 and 19–20 connecting the collector of transistor 10 to the bases of transistors 16 and 21 respectively. Diodes 22 and 23 both being in the emitter circuit of transistor 21 cause its change of state to occur at a time later than the change of state of transistor 16 having only diode 23 in its emitter circuit. This forestalls transistor 18 and transistor 21 being on at the same time during steady state operating conditions. Transistor 18 is turned off by the conductance of transistor 16 which causes the base voltage of transistor 18 to be reduced to approximately zero by providing a low resistance path to common. Since transistor 16 actuates prior to transistor 21, transistor 18 must always be off before transistor 21 is on. Disruption of this sequence would cause the D.C. power supply 32 to be short-circuited through transistors 18 and 21 and diodes 22 and 23.

Transistors 26 and 31 are now placed in an off condition in that the conductance of transistor 21 effectively short-circuits the voltage appearing on their bases and the presence of diodes 22 and 23 in their emitters produces positive emitter bias with respect to their bases. When transistor 26 is shut off, its collector being connected to the base of transistor 28, it causes a (+) voltage to appear on the base of transistor 28 placing it in an on position. Similarly to the switching sequence of transistor 18, the state of transistor 18 being in conduce the same effect in transistors 26, 28 and 30 preventing transistors 28 and 31 being turned on at the same time. In this second or on state of transistor 10, the voltage appearing at output terminal 48 is +27 volts, this terminal being connected to the (+) side of the power supply 32 by the on state of transistor 28. Output terminal 47 is connected to the (−) side of the power supply 32 through the on condition of transistor 21 and the forward resistances of diodes 22 and 23. This effectively produces a reversal of polarity in output voltage with respect to the off state of transistor 10 and is again shown by the voltage diagram of FIG. 2.

To summarize, the transmitted signal is sensed, amplified and rectified, and then used to shut transistor 10 on or off in accordance with the presence or lack of a signal pulse. Transistor 10, connected in series with transistors 16 and 21, controls their on-off state in accordance with its own. Transistor 16 controls the state of transistor 18, the state of transistor 18 being in contraposition to transistor 16. Transistors 18 and 21 are connected in series across D.C. power supply 32 terminals; it is obvious that an output terminal 47 tied to the junction of transistors 18 and 21 will see a (+) voltage if transistor 18 is on or a (−) voltage if transistor 21 is on. It is further obvious that transistors 18 and 21 must be prevented from having their on condition occur at the same time. Transistors 26 and 31 are controlled by transistor 21. When transistor 21 is on, both transistors 26 and 31 are off, and conversely, when transistor 21 is off, the other two are on. Transistor 26 in turn controls transistor 28 in the same manner. Transistors 28 and 31, as transistors 18 and 21, are connected in series across the power supply 32, and a terminal 48 connected to the junction of transistors 28 and 31 will indicate a (+) voltage or (−) voltage dependent upon the state of conductance of the transistors. Again it is obvious that transistors 28 and 31 must never be on at the same time. Since the foregoing circuit analysis discloses that transistors 18 and 31 are in contraposition to transistors 21 and 22 respectively, then the output terminals 47 and 48 impress an alternating polarity voltage of code frequency upon electrical load comprising; signal apparatus 49, which apparatus, by means of circuits 50 through 54 tuned to the specific code frequencies, activates the repeater apparatus 55 to perform the desired controlling and signaling functions.

Although the present embodiment is considered the most appropriate to the indicated application, it is obvious that as one skilled in the art reads the foregoing description and analysis, possible variations and circuit modifications will become evident. As example, the transistors may be replaced by other solid state switching devices, integrated circuitry may replace discrete components, larger power requirements may be handled by selecting devices of higher rating. It is thus intended that this embodiment be illustrative rather than confining as to the scope of the present invention.

What is claimed is:

1. In a railway cab signaling system a circuit wherein voltage from a fixed polarity D.C. voltage source is changed to alternating polarity voltage of a predetermined code frequency for controlling train operation, comprising in combination, input means for generating electrical pulses of said code frequency, a first solid state switching means electrically connecting to said input means for turning off and on in response to said electrical pulses, a plurality of other solid state switching means electrically connecting to said first solid state switching means and said D.C. voltage source and responsive to the conductance state of said first solid state switching means for pole-changing said D.C. voltage at said code frequency, and signaling apparatus electrically connecting to said other solid state switching means for giving distinctive indications corresponding to said code frequency.

2. The system of claim 1 wherein the solid state switching means are transistor switching means.

3. In a railway cab signaling system a circuit, wherein voltage from a two terminal fixed polarity D.C. voltage source is changed to an alternating polarity voltage of a predetermined code frequency for controlling train operation, comprising in combination: an input means for generating electrical pulses of said code frequency; a first solid state switching means electrically connecting to said input means and turning off and on in response to said electrical pulses; a second and third solid state switching means electrically connecting to said first solid state switching means for turning off and on in response to said first solid state switching means, a fourth solid state switching means electrically connecting to and turning off and on in response to said second solid state switching means, said third and fourth solid state switching means electrically connecting in series across said two terminals of said D.C. voltage source; a fifth and sixth solid state switching means electrically connecting to said third solid state switching means and turning off and on in response to said third solid state switching means, a seventh solid state switching means electrically connecting to and turning off and on in response to said fifth solid state switching means, said sixth and seventh solid state switching means electrically connecting in series across said two terminals of said D.C. voltage source; said sixth and third solid state switching means electrically connecting to the same terminal of said D.C. voltage source and said fourth and seventh solid state switching means electrically connecting to the other terminal of said D.C. voltage source; switching sequence control means for preventing the solid state switching means of each of said third and fourth, and said sixth and seventh solid state switching means pairs from being on at the same time; and signaling apparatus having one terminal electrically connecting to said third and fourth solid state switching means, a second terminal electrically connecting to said sixth and seventh solid state switching means for giving distinctive indications corresponding to said code frequency.

4. The invention of claim 3 wherein the solid state switching means comprises transistor switching means.

5. The invention of claim 3 wherein the switching sequence control means comprise diodes and time delay circuit means electrically connecting to said second, third, fifth and seventh solid state switching means for preventing the solid state switching means of each of said third and fourth, and said sixth and seventh solid state switching means pairs from being on at the same time.

6. In a railway cab signaling system a circuit wherein voltage of a two terminal fixed polarity D.C. voltage source is changed to alternating voltage of predetermined code frequency for controlling train operation comprising in combination: input means for supplying electrical pulses of said code frequency; a first transistor electrically connecting to said input means having base, emitter and collector terminals for turning off and on in response to said electrical pulses; a second and a third transistor having base, emitter and collector terminals and turning off and on in response to said first transistor; a first voltage dividing circuit means electrically connecting said first transistor to said second and third transistors for controlling the off and on conductance state of the second and third transistors; a fourth transistor having base, collector and emitter terminals, electrically connecting to said second and third transistors, and to the first of the terminals of said D.C. voltage sources and turning off and on in response to said second transistor; said third transistor connects to the second terminal of said D.C. voltage source, thereby resulting in said third and fourth transistors being connected in series across said D.C. voltage source; a fifth and a sixth transistor having base, collector and emitter terminals and turning off and on in response to said third transistor; a second voltage dividing circuit means electrically connecting said fifth and sixth transistors to said third transistor for controlling the off and on conductance states of said fifth and sixth transistors; a seventh transistor having base, collector and emitter terminals electrically connecting to said fifth and sixth transistors, and to the first terminal of said D.C. voltage source and turning off and on in response to said fifth transistor; said sixth transistor electrically connects to the second terminal of said D.C. voltage source thereby resulting in said fifth and seventh transistors being connected in series across said D.C. voltage source; switching sequence control means for preventing the transistors of each of said third and fourth, and said sixth and seventh transistor pairs from being on at the same time; and signaling apparatus having a first terminal electrically connecting to said third and fourth transistors, a second terminal electrically connecting to said sixth and seventh transistors and tuned circuit means for giving distinctive indications corresponding to said code frequency.

7. The invention of claim 6 wherein switching sequence control means comprise: a first and a second diode having cathode and anode terminals, the anode of said first diode electrically connecting to the emitters of said third and sixth transistors, the cathode of said first diode and the anode of said second diode electrically connecting together and to the emitters of said second and fifth transistors and the cathode of said second diode electrically connecting to the second terminal of said D.C. voltage sources for preventing the transistors of each of said third and fourth, and said sixth and seventh transistor pairs from being on at the same time; and a third and fourth diode having their anodes electrically connecting to the bases of said third and sixth transistors respectively and their cathodes electrically connecting to a first terminal of a capacitor, a resistor electrically connecting the first terminal of said capacitor to the first terminal of said D.C. voltage source, and a second terminal of said capacitor electrically connecting to the second terminal of said D.C. voltage source for preventing said third and sixth transistors from being on during initial start up.

8. The invention of claim 6 wherein said first and second voltage dividing circuit means comprise four series resistor pair combinations the first resistors of each of said series resistor pairs electrically connecting the collectors of said first and third transistors to the bases of each tranistor of said second and third, and said fifth and sixth transistor pairs respectively; and second resistors electrically connecting the bases of each transistor of said second, third, fifth and sixth transistors respectively to the second terminal of said D.C. voltage source.

9. The invention of claim 6 wherein input means comprise; means for transmitting a signal of said code frequency, sensing means attached to said railway cab for acquiring said signal, filter means electrically connecting to said sensing means for suppressing all frequencies other than said code frequency, a potentiometer electrically connecting to said filter means for changing the level of said signal, a first circuit means electrically connecting to said potentiometer for amplifying said signal, and a second circuit means electrically connecting to said amplifier means for rectifying said amplified signal.

10. In a railway cab signaling system a circuit wherein voltage from a two terminal fixed polarity D.C. voltage source is changed to an alternating polarity voltage of predetermined code frequency for controlling train operation, comprising in combination: apparatus means for transmitting a signal of said code frequency along the tracks; sensing means attached to said railway cab for acquiring said signal; filter means electrically connecting to said sensing means for suppressing all frequencies but said code frequency; a potentiometer electrically connecting to said filter means for changing the level of said signal; amplifier means electrically connecting to said potentiometer for amplifying said signal; rectifier circuit means electrically connecting to said amplifier for rectifying said amplified signal; a first transistor having base, emitter and collector terminals, and turning off and on in response to said rectifier circuit means output, said base electrically connecting to said rectifier circuit means; a second and third transistor having base, emitter and collector terminals and turning off and on in correspondence to the state of said first transistor; a resistor circut means electrically connecting the collector of said first transistor to the bases of said second and third transistors for controlling the state of conductance of said second and third transistors; a fourth transistor having base, collector and emitter terminals, said base electrically connecting to said collector of said second transistor, said emitter electrically connecting to said collector of said third transistor, said collector of said fourth transistor electrically connecting to first of said two terminals of said D.C. voltage source and turning off and on in contraposition to said second transistor; a fifth and sixth transistor having base, collector and emitter terminals, and turning off and on in contraposition to said third transistor; a second resistor circuit means electrically connecting the bases of said fifth and sixth transistors to said collector of said third transistor for controlling the state of conductance of said fifth and sixth transistors; a seventh transistor having base, collector and emitter terminals, said base electrically connecting to said collector of said fifth transistor, said emitter electrically connecting to said collector of said sixth transistor, said collector of said seventh transistor electrically connecting to said first terminal of said D.C. voltage source and turning off and on in contraposition to said fifth transistor; a first and a second diode having cathode and anode terminals said anode of said first diode electrically connecting to said emitters of said third and sixth transistors, said cathode of said first diode and said anode of said second diode electrically connecting together and to said emitters of said second and fifth transistors, said cathode of said second diode electrically connecting to said second terminal of said D. C. voltage source and for providing bias and switching sequence control to said second, third, fifth and sixth transistors; a clamping circuit comprising, a third and a fourth diode having anode and cathode terminals, said anode terminals electrically connecting to said base of said third and sixth transistors respectively, a capacitor having a first terminal electrically connecting to said cathodes of said third and fourth diodes and a second terminal electrically connecting to said second terminal of said D.C. voltage source, and a resistor electrically connecting said first terminal of said capacitor to said first terminal of said D.C. voltage source for holding said third and sixth transistors in an off state when said D.C. voltage source is initially applied to said circuit; and signaling apparatus having one terminal electrically connecting to said collectors and emitters of said third and fourth transistors respectively, a second terminal electrically connecting to said collectors and emitters of said sixth and seventh transistors respectively, and tuned circuit means for giving distinctive indications corresponding to said code frequency.

References Cited

UNITED STATES PATENTS 2,731,553 1/1956 Zaffarano et al. ------ 246—63

DRAYTON E. HOFFMAN, *Primary Examiner.*

U.S. Cl. X.R.

340—171